United States Patent [19]
Kajiwara et al.

[11] Patent Number: 6,013,237
[45] Date of Patent: Jan. 11, 2000

[54] METHOD FOR PREPARING HIGH-PURITY AQUEOUS HYDROGEN PEROXIDE

[75] Inventors: Shoichiro Kajiwara; Hirokazu Serizawa; Kazunori Nagai, all of Yamakita-machi, Japan

[73] Assignee: Mitsubishi Gas Chemical Company, Inc., Tokyo, Japan

[21] Appl. No.: 09/035,265

[22] Filed: Mar. 5, 1998

[30] Foreign Application Priority Data

Mar. 27, 1997 [JP] Japan ............................ 9-075584

[51] Int. Cl.⁷ ............................................. C01B 15/01
[52] U.S. Cl. ............................................................... 423/584
[58] Field of Search .......................................... 423/584

[56] References Cited

U.S. PATENT DOCUMENTS

| | | | |
|---|---|---|---|
| 5,200,166 | 4/1993 | Shiga et al. | 423/584 |
| 5,534,238 | 7/1996 | Kajiwara et al. | 423/584 |
| 5,733,521 | 3/1998 | Minamikawa et al. | 423/584 |

FOREIGN PATENT DOCUMENTS

| | | |
|---|---|---|
| 4222109A1 | 1/1994 | Denmark . |
| 2677010A1 | 12/1992 | France . |
| 2677011A1 | 12/1992 | France . |
| 91/00778A1 | 1/1991 | WIPO . |

*Primary Examiner*—Wayne Langel
*Attorney, Agent, or Firm*—Antonelli, Terry, Stout & Kraus, LLP

[57] ABSTRACT

There is herein disclosed a method for preparing high-purity aqueous hydrogen peroxide by bringing aqueous hydrogen peroxide into contact with a strongly basic anion exchange resin, said method comprising the step of using the strongly basic anion exchange resin which is converted into a form of an exchange group at the time of the purification of aqueous hydrogen peroxide by bringing the strongly basic anion exchange resin into contact with a liquid agent passed through a filter having an average pore diameter of 1.0 $\mu$m or less.

According to the present invention, aqueous hydrogen peroxide containing inorganic impurities such as metals and metallic compounds can be purified to prepare extremely high-purity aqueous hydrogen peroxide.

4 Claims, No Drawings

METHOD FOR PREPARING HIGH-PURITY AQUEOUS HYDROGEN PEROXIDE

BACKGROUND OF THE INVENTION

1. Field of the Invention

The present invention relates to a method for stably preparing extremely high-purity aqueous hydrogen peroxide by safely purifying aqueous hydrogen peroxide containing inorganic impurities. Aqueous hydrogen peroxide purified by the present invention can be used particularly in a semiconductor manufacturing field.

2. Description of the Related Arts

At present, hydrogen peroxide has mainly been manufactured by an anthraquinone process, but in aqueous hydrogen peroxide prepared by this method, various kinds of inorganic impurities are contained. In general, several hundreds μg/l of the inorganic impurities are contained in aqueous hydrogen peroxide having a concentration of 5 to 70% by weight which is a substantially practical concentration. On the other hand, in a semiconductor manufacturing field, the high-purity aqueous hydrogen peroxide is required, and in recent years, such extremely high-purity aqueous hydrogen peroxide that the concentration of the remaining inorganic impurities is about 0.05 μg/l or less has been required.

Heretofore, as a technique for removing the inorganic impurities from aqueous hydrogen peroxide to purify the same, there is known a method which comprises bringing aqueous hydrogen peroxide into contact with an ion exchange resin. Most of metals contained in aqueous hydrogen peroxide can be removed therefrom by bringing aqueous hydrogen peroxide into contact with a strongly acidic cation exchange resin. Furthermore, chloride ion, sulfate ion and a part of metallic compounds can be removed by bringing aqueous hydrogen peroxide into contact with a strongly basic anion exchange resin.

That is to say, the purification of aqueous hydrogen peroxide can be carried out by using the strongly acidic cation exchange resin singly, the strongly basic anion exchange resin singly, a mixture thereof singly, or a combination of these ion exchange resins. Examples in which the purification of aqueous hydrogen peroxide can be carried out by the use of these ion exchange resins have been disclosed in Japanese Patent Publication No. 16677/1960, German Patent Application Laid-open Nos. 4214075 and 4222109, French Patent No. 2677011, and Japanese Patent Application Laid-open Nos. 17105/1993 and 172805/1995.

Particularly, in order to obtain, by the purification, such extremely high-purity aqueous hydrogen peroxide as to be required in the semiconductor manufacturing field, it is usual to use the cation exchange resin and the anion exchange resin together. That is to say, the anion exchange resin which can be used in the purification of aqueous hydrogen peroxide occupies an influential position together with the cation exchange resin.

In Japanese Patent Publication No. 16677/1960 mentioned above has described a method for purifying aqueous hydrogen peroxide through an anion exchange resin converted into a bicarbonate form by treating it with an aqueous sodium bicarbonate solution. However, when this method is merely used together with the cation exchange resin, there cannot be obtained the high-purity aqueous hydrogen peroxide having a metal impurity concentration of about 0.05 ppb by weight or less which has been required of late. That is to say, metals such as calcium, copper and iron cannot sufficiently be removed by this purification, so that they inconveniently remain in aqueous hydrogen peroxide.

Furthermore, in Japanese Patent Application Laid-open No. 172805/1995 mentioned above, there has been disclosed a method for purifying aqueous hydrogen peroxide through an anion exchange resin converted into a carbonate form or a bicarbonate form by treating the anion exchange resin with an aqueous ammonium carbonate or ammonium bicarbonate solution in order to prevent sodium from dissolving out from the anion exchange resin. Even by the use of this method, it is difficult to obtain the high-purity aqueous hydrogen peroxide having a metal impurity concentration of about 0.05 ppb by weight or less.

SUMMARY OF THE INVENTION

An object of the present invention is to provide an anion exchange resin which can suitably be used to purify aqueous hydrogen peroxide containing inorganic impurities such as metals and metallic compounds, thereby preparing high-purity aqueous hydrogen peroxide in which the amounts of these impurities are extremely small.

Another object of the present invention is to provide a method for purifying aqueous hydrogen peroxide by the use of the above-mentioned anion exchange resin.

The present inventors have intensively investigated to achieve the above-mentioned objects, and as a result, it has been found that, when an aqueous solution of a carbonate, a bicarbonate or a hydroxide passed through a filter having an average pore diameter of 1.0 μm or less is used as a liquid agent in converting a strongly basic anion exchange resin into a carbonate form, a bicarbonate form or a hydroxide form, metallic impurities such as calcium, copper and iron which remain in the anion exchange resin can be removed therefrom to the utmost, and thus, when aqueous hydrogen peroxide is purified through the carbonate form, the bicarbonate form or the hydroxide form strongly basic anion exchange resin prepared in the above-mentioned manner, the purified aqueous hydrogen peroxide having a higher purity than in a conventional case can be obtained. In consequence, the present invention has been completed.

That is to say, the present invention is directed to a method for preparing high-purity aqueous hydrogen peroxide by bringing aqueous hydrogen peroxide into contact with a strongly basic anion exchange resin, said method comprising the step of using the strongly basic anion exchange resin which is converted into a form of an exchange group at the time of the purification of aqueous hydrogen peroxide by bringing the strongly basic anion exchange resin into contact with a liquid agent passed through a filter having an average pore diameter of 1.0 μm or less.

DETAILED DESCRIPTION OF THE INVENTION

An anion exchange resin which can be used in the present invention is a strongly basic anion exchange resin having a quaternary ammonium group as an exchange group. Usually, commercially available is the strong basic anion exchange resin in which the form of the exchange group is a halide form, and hence, prior to its use for in the purification of aqueous hydrogen peroxide, the strongly basic anion exchange resin is required to be converted into a carbonate form, a bicarbonate form or a hydroxide form by bringing the strongly basic anion exchange resin into contact with an aqueous solution containing a dissolved carbonate, bicarbonate or hydroxide.

The conversion of the anion exchange resin into the carbonate form, the bicarbonate form or the hydroxide form can be directly carried out from the commercially available resin having the above-mentioned form, or prior to this conversion, the anion exchange resin may be washed with an acidic solution, an aqueous alkali solution and/or an organic solvent for the purpose of removing impurities from the ion exchange resin.

In the present invention, the strongly basic anion exchange resin can be converted into the carbonate form, the bicarbonate form or the hydroxide form with a liquid agent passed through a filter having an average pore diameter of 1.0 $\mu$m or less, preferably 0.05 to 1.0 $\mu$m.

In the present invention, the pore diameter of the filer can be regulated in a manner using polystyrene latex standard particles. As the polystyrene latex standard particles, for example, particles made by Dow Chemical Co. or Japan Synthetic Rubber Co., Ltd. can be used. The pore diameter can be determined by passing each of ultrapure waters, in which the polystyrene latex standard particles having different average diameters are dispersed, through the filter, measuring turbidities of the ultrapure water by ultraviolet light before and after the passage, and then calculating a ratio of the particles which are prevented from passing therethrough. In the passage test, the standard particles having a plurality of different average diameters are successively passed through the filter. When the passage prevention ratio is in excess of 70% for the first time, the average diameter of the particles at this time is regarded as the average pore diameter of the filter.

No particular restriction is put on a material of the filter, and any material is acceptable, so long as it is not deteriorated by the liquid agent and components are scarcely dissolved out from itself. Examples of the suitably usable filter material include polyether sulfones, polypropylene and polytetrafluoroethylene. A shape of the filter is not limited, either. That is to say, the filter may take any shape of a plane film, a pleat, a spiral and a hollow string.

The liquid agent which can be used to convert the form of the exchange group of the anion exchange resin into the carbonate form, the bicarbonate form or the hydroxide form can be prepared by, for example, dissolving a sodium salt, a potassium salt or an ammonium salt of carbonic acid or bicarbonic acid, or sodium hydroxide, potassium hydroxide or aqueous ammonia ($NH_4OH$) in utrapure water. A concentration of such an agent can be set up to its solubility in water, and no particular restriction is put on the concentration of its aqueous solution, so long as it is within the concentration range in which the agent is dissolved. In the case that the aqueous solution having a high concentration is afterward passed through the filter, however, this filter tends to clog with, particularly, crystals of the carbonate or the bicarbonate, so that the passage of the liquid agent might be difficult.

In view of this fact, in the case of sodium carbonate, its concentration is preferably in the range of 0.1 to 0.6 mol/l in the case of sodium bicarbonate, its concentration is preferably in the range of 0.1 to 0.8 mol/l; and in the case of ammonium bicarbonate, its concentration is preferably in the range of 0.1 to 1.5 mol/l. Furthermore, in each case of potassium carbonate, ammonium carbonate, potassium bicarbonate, sodium hydroxide, potassium hydroxide and aqueous ammonia, its concentration is preferably in the range of 0.1 to 2 mol/l.

No particular restriction is put on a temperature of the liquid agent at the time of the passage through the filter, but it is preferably in the range of 0 to 50° C. A passage velocity of the liquid agent is not limited, either, and an optional passage velocity can be selected, so long as it is a practical velocity. In addition, the liquid agent is required to be passed through the filter at least once, but it may be passed therethrough several times.

Next, the strongly basic anion exchange resin is converted into the carbonate form, the bicarbonate form or the hydroxide form with the liquid agent passed through the filter. This conversion manner is not restrictive, either. That is to say, there may be employed either of a batch system in which the anion exchange resin is poured into the aqueous solution and then allowed to stand or stirred, and a continuous system in which the anion exchange resin is filled into a column and the aqueous solution is then passed through the column. However, the continuous system is more effective from the viewpoints of operativity and a conversion efficiency. For example, the anion exchange resin is filled into the column, and the liquid agent is then passed through the column in such an amount that an equivalent of the liquid agent is five time or more as much as a capacity of the anion exchange resin, whereby it is converted into the carbonate form, the bicarbonate form or the hydroxide form. Afterward, the anion exchange resin is washed with ultrapure water, and then used for the purification of aqueous hydrogen peroxide. In this case, the dissolution, into aqueous hydrogen peroxide, of sodium or potassium derived from the salt present in the liquid agent can be prevented by sufficiently washing the exchange resin with ultrapure water.

In the purification of aqueous hydrogen peroxide, the thus prepared anion exchange resin can be used singly, but the use of a combination of the anion exchange resin and a cation exchange resin is more effective. Examples of the usable combination include a combination of this anion exchange resin and a hydrogen form cation exchange resin, a mixture of these ion exchange resins, and a combination of these ion exchange resins and the ion exchange resin mixture. The cation exchange resin which can be used herein is a strongly acidic cation exchange resin which has a sulfonic group as the exchange group and which is converted into the hydrogen form.

No particular restriction is put on a hydrogen peroxide concentration of aqueous hydrogen peroxide to be purified, but a practical concentration of 5 to 70% by weight is used. Furthermore, a temperature of aqueous hydrogen peroxide at the time of the purification is not limited, either, but at an excessively high temperature, the decomposition of hydrogen peroxide may inconveniently be caused. Therefore, the temperature of aqueous hydrogen peroxide is preferably in the range of from the freezing point of the aqueous hydrogen peroxide to 30° C.

No particular restriction is put on a manner of bringing the ion exchange resin into contact with aqueous hydrogen peroxide. That is to say, there may be employed either of a batch system in which the ion exchange resin is poured into aqueous hydrogen peroxide and then allowed to stand or stirred, and a continuous system in which the ion exchange resin is filled into a column and aqueous hydrogen peroxide is then passed through the column. However, the continuous system is more effective from the viewpoints of operativity and a purification degree.

According to the present invention, aqueous hydrogen peroxide containing inorganic impurities such as metals and metallic compounds can be purified to prepare extremely high-purity aqueous hydrogen peroxide.

Next, the present invention will be described in accordance with examples, but the scope of the present invention should not be limited to these examples at all. Incidentally, an analysis of a metal concentration was carried out by an ICP-MS (inductively coupled plasma-mass spectrometry) method.

EXAMPLE 1

A powder of sodium carbonate (JIS special grade, made by Kanto Chemical Co., Inc.) was dissolved in ultrapure water to prepare a 0.5 mol/l solution. Next, this solution was filtered through a filter of polytetrafluoroethylene having an average pore diameter of 0.2 μm made by Toyo Roshi Kaisha, Ltd. On the other hand, a strongly basic anion exchange resin IRA-904 (chloride form) made by Organo Corporation was filled into a column, and this filtered aqueous solution was then passed through the column at an SV (space velocity) of 10 hr$^{-1}$ for 2 hours. Afterward, ultrapure water was passed therethrough at an SV of 10 hr$^{-1}$ for 3 hours to obtain a carbonate form anion exchange resin.

Next, 30 wt% aqueous hydrogen peroxide containing 2 wt ppb of Ca, 0.5 wt ppb of Cu and 4 wt ppb of Fe as impurities was passed through a column filled with a hydrogen form strongly acidic cation exchange resin 201B made by Organo Corporation and another column filled with the strongly basic anion exchange resin obtained by the above-mentioned procedure at an SV of 200 hr$^{-1}$ in this order to purify aqueous hydrogen peroxide. Metal concentrations in the thus purified aqueous hydrogen peroxide are shown in a table.

EXAMPLE 2

Aqueous hydrogen peroxide was purified by the same procedure as in Example 1 except that a filter of polytetrafluoroethylene having an average pore diameter of 1.0 μm made by Toyo Roshi Kaisha Ltd. was used. Metal concentrations in the purified aqueous hydrogen peroxide are shown in the table.

EXAMPLE 3

Aqueous hydrogen peroxide was purified by the same procedure as in Example 1 except that sodium bicarbonate (JIS special grade, made by Kanto Chemical Co., Inc.) was used in place of sodium carbonate. Metal concentrations in the purified aqueous hydrogen peroxide are shown in the table.

EXAMPLE 4

Aqueous hydrogen peroxide was purified by the same procedure as in Example 1 except that sodium bicarbonate (JIS special grade, made by Kanto Chemical Co., Inc.) was used in place of sodium carbonate and a filter of polytetrafluoroethylene having an average pore diameter of 0.5 μm made by Toyo Roshi Kaisha Ltd. was used. Metal concentrations in the purified aqueous hydrogen peroxide are shown in the table.

EXAMPLE 5

Aqueous hydrogen peroxide was purified by the same procedure as in Example 1 except that sodium bicarbonate (JIS special grade, made by Kanto Chemical Co., Inc.) was used in place of sodium carbonate and a filter of polytetrafluoroethylene having an average pore diameter of 1.0 μm made by Toyo Roshi Kaisha Ltd. was used. Metal concentrations in the purified aqueous hydrogen peroxide are shown in the table.

EXAMPLE 6

Aqueous hydrogen peroxide was purified by the same procedure as in Example 1 except that sodium hydroxide (JIS special grade, made by Kanto Chemical Co., Inc.) was used in place of sodium carbonate. Metal concentrations in the purified aqueous hydrogen peroxide are shown in the table.

EXAMPLE 7

Aqueous hydrogen peroxide was purified by the same procedure as in Example 1 except that sodium hydroxide (JIS special grade, made by Kanto Chemical Co., Inc.) was used in place of sodium carbonate and a filter of polytetrafluoroethylene having an average pore diameter of 1.0 μm made by Toyo Roshi Kaisha Ltd. was used. Metal concentrations in the purified aqueous hydrogen peroxide are shown in the table.

COMPARATIVE EXAMPLE 1

Aqueous hydrogen peroxide was purified by the same procedure as in Example 1 except that an aqueous sodium carbonate solution was not filtered through a filter. Metal concentrations in the purified aqueous hydrogen peroxide are shown in the table.

COMPARATIVE EXAMPLE 2

Aqueous hydrogen peroxide was purified by the same procedure as in Example 1 except that a filter of polytetrafluoroethylene having an average pore diameter of 3.0 μm made by Toyo Roshi Kaisha Ltd. was used. Metal concentrations in the purified aqueous hydrogen peroxide are shown in the table.

COMPARATIVE EXAMPLE 3

Aqueous hydrogen peroxide was purified by the same procedure as in Comparative Example 2 except that sodium bicarbonate (JIS special grade, made by Kanto Chemical Co., Inc.) was used in place of sodium carbonate. Metal concentrations in the purified aqueous hydrogen peroxide are shown in the table.

COMPARATIVE EXAMPLE 4

Aqueous hydrogen peroxide was purified by the same procedure as in Comparative Example 2 except that sodium hydroxide (JIS special grade, made by Kanto Chemical Co., Inc.) was used in place of sodium carbonate. Metal concentrations in the purified aqueous hydrogen peroxide are shown in the table.

TABLE

| (Metal concentrations in purified aqueous hydrogen peroxide) | | | |
|---|---|---|---|
| | Ca (wt ppt) | Cu (wt ppt) | Fe (wt ppt) |
| Example 1 | 22 | 10 | 11 |
| Example 2 | 29 | 25 | 18 |
| Example 3 | 21 | 28 | 20 |
| Example 4 | 22 | 30 | 21 |
| Example 5 | 27 | 32 | 24 |
| Example 6 | 30 | 26 | 25 |
| Example 7 | 35 | 29 | 30 |
| Comp. Ex. 1 | 120 | 68 | 87 |
| Comp. Ex. 2 | 112 | 49 | 88 |
| Comp. Ex. 3 | 92 | 53 | 60 |
| Comp. Ex. 4 | 79 | 62 | 50 |

What is claimed is:

1. A method for preparing high-purity aqueous hydrogen peroxide, comprising the steps of:

a) passing an aqueous solution containing at least one dissolved substance selected from the group consisting of carbonate, bicarbonate and hydroxide through a filter having an average pore diameter of at most 1.0 μm, forming a filtered aqueous solution;

b) converting a strongly basic anion exchange resin into a carbonate, bicarbonate or hydroxide form by bringing the strongly basic anion exchange resin into contact with said filtered aqueous solution, forming a converted strongly basic anion exchange resin; and c) bringing aqueous hydrogen peroxide into contact with said converted strongly basic anion exchange resin.

2. The method for preparing high-purity aqueous hydrogen peroxide according to claim 1, wherein said filter is made of a material selected from the group consisting of polyether sulfone, polypropylene and polytetrafluoroethylene.

3. The method for preparing high-purity aqueous hydrogen peroxide according to claim 1, wherein said aqueous hydrogen peroxide is also passed through a cation exchange resin.

4. A method for preparing high-purity aqueous hydrogen peroxide, comprising the step of:

bringing aqueous hydrogen peroxide into contact with a converted strongly basic anion exchange resin, wherein the converted strongly basic anion exchange resin has been formed by a procedure including steps of (a) passing an aqueous solution containing at least one dissolved substance selected from the group consisting of carbonate, bicarbonate and hydroxide through a filter having an average pore diameter of at most 1.0 μm, forming a filtered aqueous solution, and (b) converting a strongly basic anion exchange resin into a carbonate, bicarbonate or hydroxide form by bringing the strongly basic anion exchange resin into contact with said filtered aqueous solution to form the converted strongly basic anion exchange resin.

* * * * *